No. 850,995. PATENTED APR. 23, 1907.
J. W. BURKETT.
REVERSING MECHANISM FOR POWER SHAFTS.
APPLICATION FILED AUG. 15, 1906.
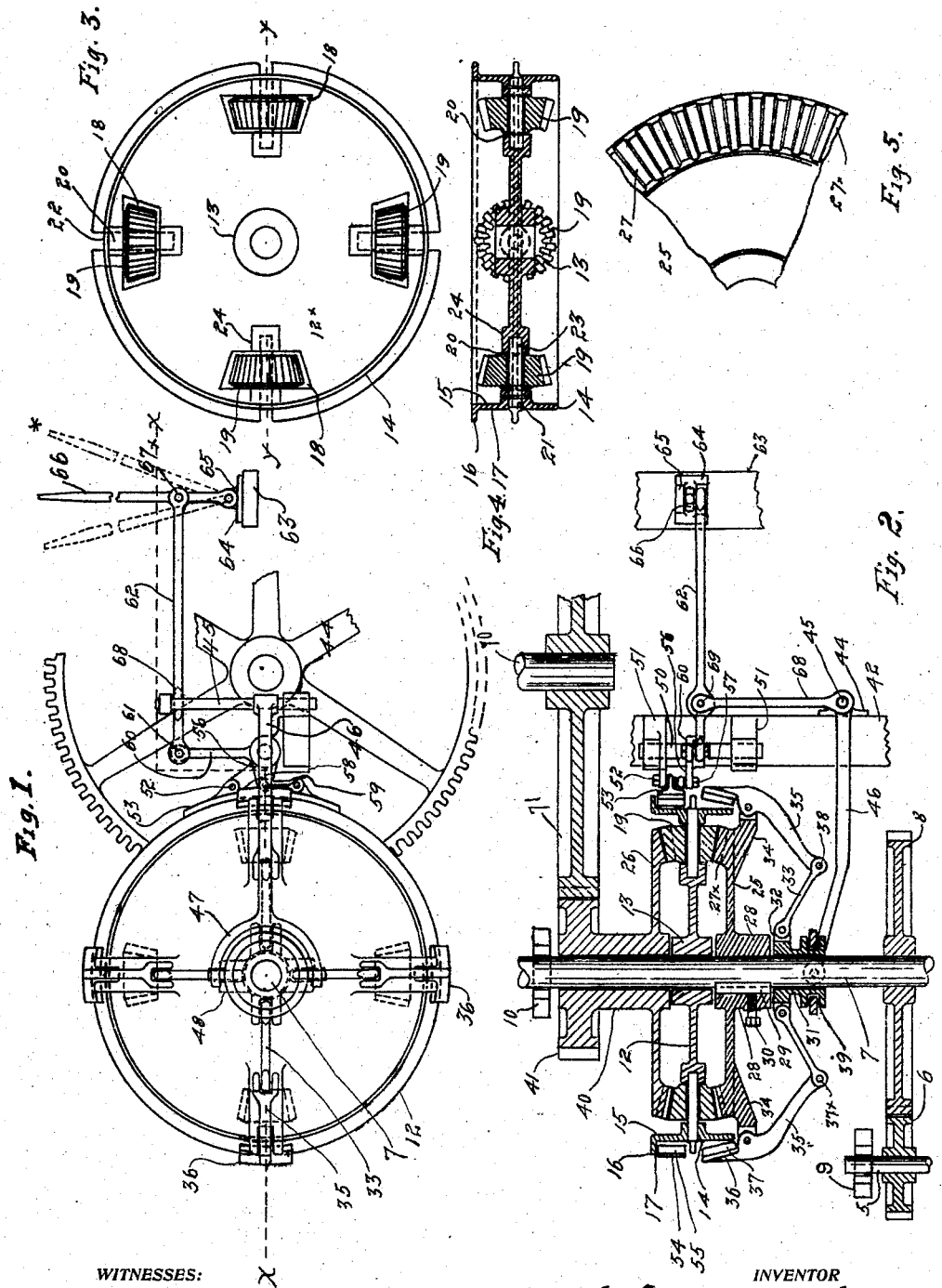

UNITED STATES PATENT OFFICE.

JOHN W. BURKETT, OF KANSAS CITY, KANSAS, ASSIGNOR TO KANSAS CITY HAY PRESS COMPANY, A CORPORATION OF MISSOURI.

REVERSING MECHANISM FOR POWER-SHAFTS.

No. 850,995.        Specification of Letters Patent.        Patented April 23, 1907.

Application filed August 15, 1906. Serial No. 330,721.

*To all whom it may concern:*

Be it known that I, JOHN W. BURKETT, a citizen of the United States of America, residing at Kansas City, in the county of Wyandotte and State of Kansas, have invented certain new and useful Improvements in Reversing Mechanism for Power-Shafts; and I do hereby declare that the following is a full, clear, and exact description of the invention, such as will enable others to make and use the same, reference being had to the accompanying drawings, forming a part of this specification.

The object of the invention is to effect the change in the direction of rotation of the driven shaft with great rapidity and minimum shock and with the employment of a single operating-lever.

The invention consists in the novel construction and combination of parts, such as will be first fully described and then specifically pointed out in the claim.

In the drawings, Figure 1 is a side view of mechanism embodying the invention. Fig. 2 is a horizontal sectional view taken upon the line $x\ x$ of Fig. 1, showing in addition a broken portion of the main driving-shaft and pinion and the gear-wheel on the driven shaft meshing with the pinion. Fig. 3 is a detail side view, and Fig. 4 is a horizontal sectional view, of the spider on the driven shaft, the latter figure being taken on line $y\ y$ on Fig. 3. Fig. 5 is a detail view in perspective of a portion of one of the gear-wheels, taken from the direction of the inner surface.

Similar numerals of reference indicate corresponding parts in all the figures of the drawings.

Referring to the drawings, 5 indicates a driving-shaft which receives the power from an engine (not shown) or other suitable source. Upon this shaft is a small gear wheel or pinion 6.

7 indicates a power operated or driven shaft which, as shown, is parallel with shaft 5, upon which shaft is a large gear-wheel 8, meshing with the small gear 6 on shaft 5. The latter shaft is mounted in journal-boxes 9 at the ends, while the former shaft 7 is shown mounted in a journal-box 10, it being readily understood that the shafts may be located in any position for power transmission and for which reversing mechanism is desired.

Upon the driven shaft 7 (shown intermediate its ends) is a loosely-mounted spider 12. This spider consists of a disk $12^\times$, flat upon both surfaces and formed integral with the hub 13, which hub is loosely mounted on the driven shaft 7. Upon the sides of the disk at a point a slight distance inwardly from the periphery of the disk are laterally-extended annular flanges 14 and 15, which are cast integral with the disk, the outer end portion of the flange 15 being bent at right angles and extended a short distance in a line of direction radial to shaft 7, thus forming an annular flange 16 and between the peripheral portion of the disk and the said flange a wide groove 17.

In the web or disk $12^\times$ are a number of openings 18, extending from a position near the line of the inner surfaces of the annular flanges 14 and 15 a short distance in the direction of said hub 13 and upon radial lines extending from said hub, in which openings are beveled gear-wheels 19. These gear-wheels are loosely mounted upon stationary pins 20, which are inserted within the openings 21, extending through the peripheral portion of the disk, notches 22 being made transversely in the said periphery opposite said openings, the inner ends of which pins are secured within the opening 23 in the bearings or boxes 24, cast with the disk, and near the inner surfaces of the openings 18 for the gear-wheels 19.

Upon the driven shaft 7 and upon respective opposite sides of the spider 12 are mounted the respective driving and driven circular plates or members 25 and 26, the beveled gear faces or teeth 27 upon which plates are upon inclined surfaces $27^\times$ directly opposite the bevel gear-wheels 19 on the spider 12, and with which gear-wheels 19 the teeth of the bevel-gear on the wheels 25 and 26 are in engagement.

The circular plate 25 is mounted upon a hub 28, which extends in the direction of the length of the shaft 7 a considerable distance from the outer surface of the wheel, and this hub is secured fixedly to the said shaft by means of a spline or key 29, a set-screw 30 extending through the hub and engaging with said key. Upon the shaft 7 and adjacent to the hub 28 is a sliding sleeve 31, upon the inner end and outer surface of which are perforate forked lugs 32, which are diametrically extended from the sleeve, and to said lugs are pivotally connected the inner ends of the short arms 33. Upon the outer surfaces of the circular plate 25 are fixed the brackets 34 in an axial line with shaft 7, the outer ends of which brackets extend to a position a short distance beyond the line of the annular surface of the peripheral flange of spider 12 and are forked, and between said forked ends are pivotally connected the clutch-levers 35, the short end of which levers extends to a position adjacent to the outer surface of the peripheral flange 14 on the spider 12, and upon said ends are clutch-shoes 36, upon the inner surfaces of which shoes are secured the friction-pads 37. The long outer ends of the levers 35 are bent at an angle to the short portions carrying the shoes 36 and extended inwardly and are forked at 37× and said forked ends pivotally connected at 38 to the outer ends of the arms 33 on the sliding sleeve 31. In the outer surface and outer end of sleeve 31 is an annular groove 39. The other circular plate or member 26 is mounted upon a hub 40 adjacent to its inner end, said hub being extended in length from the outer surface of the gear-wheel and is loosely mounted on shaft 7. Upon the outer end of the sleeve is a pinion 41.

42 indicates a stationary support or beam extending parallel with shaft 7 and located a short distance from the path of rotation of the clutch-shoes 36.

Upon the rear surface of the beam or support 42 and the portion of said beam opposite the sleeve 31 on shaft 7 is a vertically-arranged journal-box 44, in which is journaled the lower end of a vertical rock-shaft 45. With the portion of said shaft near the journal-box is connected rigidly the outer end of an arm 46, the inner end of which arm is forked at 47 and extended upon each side of the sleeve 31, and upon the inner surfaces of said forked portions are pins 48, which extend within the groove 39 in said sleeves, the arm 46 being bent outwardly in a slight degree. Upon the upper surface of the beam 42 and opposite the peripheral portion of the spider 12 is a small rock-shaft 50, journaled at the ends in the journal-boxes 51 on said beam.

Upon the journal-box 51 opposite in position to the groove 17 in the periphery of the spider is a bracket 52, cast integral therewith and which extends a short distance in an upward direction, and with the upper end of the bracket is connected by the pivot 53 one end of the brake-band 54, which extends upwardly within the groove 17 in the periphery of the spider 12, thence concentrically with the groove in the direction of the under surface of the beam 44, and secured to and upon the under surface of the brake-band is a frictional covering 55, such as rubber, leather, or like substances. Upon the rock-shaft 50 is an arm 56, extending in the direction of the groove 17 in the periphery on the spider 12, with the end of which arm is pivotally connected at 57 the upper end of a link 58, with the lower end of which link is pivotally connected at 59 the other or free end of the brake-band 54.

Upon the rock-shaft 50 and extending upwardly the same height as rock-shaft 45 is a lever or arm 60, with the upper end of which lever is connected pivotally at 61 one end of a horizontally-extended connecting-bar 62.

Parallel with beam 42 and a short distance forward of said beam is a like stationary support or beam 63, upon the upper surface of which is a base-plate 64, upon which is a lug 65, with which lug is pivotally connected the lower end of the operating-lever 66, which extends the requisite distance in height and with the side portion of which lever is pivotally connected at 67 the forward end of the horizontal connecting-bar 62.

With the upper end of the rock-shaft 45 is rigidly connected one end of a connecting bar or rod 68, the other end of which bar extends parallel with beam 42 in the direction of the connecting-bar 62 and is pivotally connected at 69 to the upper surface of the said bar.

70 indicates a shaft the direction of rotation of which is reversed by the mechanism herein described and is shown in a parallel position with shaft 7 and immediately forward of the supporting-beam 42. Upon this shaft is a large gear-wheel 71, which meshes with the small gear wheel or pinion 41 on the shaft 7 and from which the power is received and transmitted to shaft 70.

The operation of the invention is as follows: As seen in Figs. 1 and 2, the position of the operating-lever 66 and the brake 36 and brake-band 54 and their connections are normal. In this position of lever 66 the power from the driving-shaft 5, transmitted to gear 6 and shaft 7, causes the rotation of the circular plates 25 and is expended in communicating rotation to the bevel gear-wheels 19 in the openings 18 in the spider 12, which wheels then act as idlers, leaving the circular plate 26 standing still. In order to communicate rotation to shaft 70 from the driving-shaft 7 in one direction, power is applied to the lever 66 and said lever moved forwardly in the position indicated by the dotted lines and star in Fig. 1. In this movement of lever 66 the lever 60 communicates a partial rotation to the rock-shaft 50, drawing upwardly on arm 56 and the brake-band 54, and the spider 12 is held firmly from movement. Power communicated from the driving-shaft 5 to the shaft 7 and the circular plate 25 communicates rotary motion to the gear-wheels 19, and rotation is imparted to the circular plate 26 in an opposite direction of rotation to that of shaft 7 and a corresponding direction of rotation of shaft 70 with shaft 5. In order to reverse the direction of rotation of shaft 70, the operating-lever 66 is moved to the left, as shown in Fig. 1, as indicated in dotted lines, the full limit, which action communicates partial rotation to rock-shaft 50, releasing the brake-bar band 54, and in the same movement of the lever 66 a partial rotation is communicated to the rock-shaft 45 through bar 68 and arm 46 to the sliding sleeve 31 on the shaft 7, in which movement the forked arm 46 moves the sleeve 31 from its position near the hub 28 of the circular plate 25 away from said hub, causing the clutch-lever 35 to move outwardly and the clutch-shoes 36 to grasp the portion 14 of the periphery of the spider 12 and hold said spider from movement. Power communicated from the driving-shaft 5 to the shaft 7 causes the connection of both the circular plate or member 25 and the spider 12 with each other and joint rotation with shaft 7. The bevel gear-wheels 19 in the spider 12 are held from independent rotation by the gear-face on the circular plate 25, and the said gear 19 communicates rotation in the same direction of movement to the circular plate 26, and consequently imparts a reverse direction of rotation to the shaft 70 and gear-wheel 71.

The invention is serviceable for traction-engines, automobiles, &c., where brake and clutch operating mechanism is employed.

Having fully described my invention, what I now claim as new, and desire to secure by Letters Patent, is—

In combined clutch and brake operating mechanism the combination with a main rotary driving-shaft and a sleeve loosely mounted on said shaft and clutch-operating arms on said sleeve of a suitable support, a brake-operating horizontal rock-shaft on said support and crank-arms on said rock-shaft a pivoted operating-lever and a suitable support therefor and a connecting-bar pivotally connected with said lever and one of said arms on the said rock-shaft a vertical rock-shaft on the support for said horizontal rock-shaft an arm connected with the lower portion of the said vertical rock-shaft at one end and engaging with the sleeve on said main driving-shaft at its other end and a connecting crank-arm on said vertical rock-shaft connected at its outer end pivotally with the said connecting-bar to the pivoted operating-lever.

JOHN W. BURKETT.

Witnesses:
 EDWIN M. METCALF,
 W. M. RYNERSON.